(12) United States Patent
Kojima (10) Patent No.: US 9,899,926 B2
(45) Date of Patent: Feb. 20, 2018

(54) POWER SUPPLY DEVICE AND SEMICONDUCTOR DEVICE

(71) Applicant: KABUSHIKI KAISHA TOSHIBA, Tokyo (JP)

(72) Inventor: Hiroaki Kojima, Kunitachi Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/367,391

(22) Filed: Dec. 2, 2016

(65) Prior Publication Data

US 2017/0163161 A1    Jun. 8, 2017

Related U.S. Application Data

(60) Provisional application No. 62/261,974, filed on Dec. 2, 2015.

(51) Int. Cl.
*H02M 3/335*    (2006.01)
*H02M 1/08*    (2006.01)
*H02M 1/00*    (2006.01)

(52) U.S. Cl.
CPC ......... *H02M 3/33523* (2013.01); *H02M 1/08* (2013.01); *H02M 2001/0003* (2013.01)

(58) Field of Classification Search
CPC ......... H02M 3/33507; H02M 3/33515; H02M 3/33523; H02M 1/36

USPC .............. 363/21.12, 21.13, 21.15–21.18
See application file for complete search history.

(56) References Cited

U.S. PATENT DOCUMENTS

| 7,684,220 B2 * | 3/2010 | Fang .................... H02H 7/1203 |
| | | 361/93.2 |
| 2016/0294293 A1* | 10/2016 | Hayakawa ........ H02M 3/33523 |

FOREIGN PATENT DOCUMENTS

| JP | 2008043143 A | 2/2008 |
| JP | 5213621 B2 | 6/2013 |
| JP | 5612024 B2 | 10/2014 |
| JP | 2014236639 A | 12/2014 |

* cited by examiner

*Primary Examiner* — Nguyen Tran
(74) *Attorney, Agent, or Firm* — Patterson & Sheridan, LLP (57) ABSTRACT

A power supply device includes a primary winding and at least a first secondary winding connected to a load, a power supply to which the primary winding is connected, a switch configured to adjust a first current flowing through the primary winding, an adjustment amount generation device and a control device. The adjustment amount generation device is configured to generate an adjustment amount to reduce a change in the first current depending at least in part on a change in an output voltage of the power supply supplied to the load. The control device is configured to control the switch based at least in part on the first current, a voltage produced in secondary winding, and the adjustment amount.

17 Claims, 8 Drawing Sheets

POWER SUPPLY DEVICE AND SEMICONDUCTOR DEVICE

CROSS-REFERENCE TO RELATED APPLICATIONS

This application is based upon and claims the benefit of priority from U.S. Provisional Patent Application No. 62/261,974, filed on Dec. 2, 2015, the entire contents of which are incorporated herein by reference.

FIELD

Embodiments described herein relate generally to a power supply device, and a semiconductor device.

BACKGROUND

There are switching regulator power supply devices for acquiring an insulated output voltage, wherein two secondary windings are provided in an insulating transformer, to thereby produce a non-insulated output voltage by voltage feedback using one of the two windings on the non-insulated side, and providing an insulated output voltage using the other of the two windings on the non-insulated side. In such power supply devices, an input current is detected, which flows through primary windings of the transformer. Compensation is provided by control of a switching element using the detected current value. Such power supply devices can have fluctuations in the output voltage value due to load fluctuations on the insulated side of the power supply, and become unstable as a result of changes in the power supply voltage.

DETAILED DESCRIPTION

A power supply device according to embodiments may include, but is not limited to, a primary winding and at least a first secondary winding connected to a load, a power supply to which the primary winding is connected, a switch configured to adjust a first current flowing through the primary winding, an adjustment amount generation device, and a control device. The adjustment amount generation device is configured to generate an adjustment amount to reduce a change in the first current depending at least in part on a change in an output voltage of the power supply supplied to the load. The control device is configured to control the switch based at least in part on the first current, a voltage produced in secondary winding, and the adjustment amount.

(First embodiment)

Figure 1:
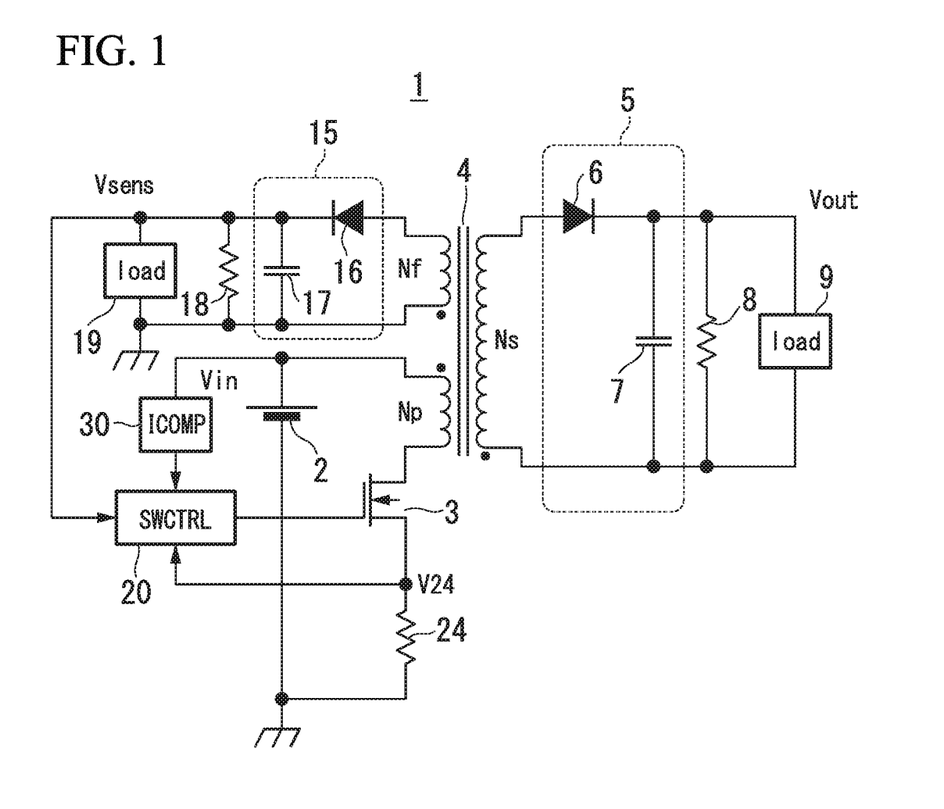
FIG. 1 is a configuration diagram illustrating a power supply device according to a first embodiment.

FIG. 1 is a configuration diagram illustrating a power supply device according to the present embodiment.

A power supply device 1 (a semiconductor device) converts power supplied from a power supply 2 and supplies the converted result to a load 9. The power supply device 1 includes a switch 3, an insulating transformer 4, rectification devices 5 and 15, resistors 8 and 18, a load 19, a control device (SWCTRL) 20, and an adjustment amount generation device (ICOMP) 30.

The switch 3 adjusts a current iop which flows through the primary winding Np of the insulating transformer 4.

The insulating transformer 4 includes primary winding Np connected to the power supply 2 and secondary winding Nf. The primary winding Np is insulated (isolated) from the load 9, which is supplied power generated by the power supply device 1. The insulating transformer 4 according to the embodiment includes a secondary winding Ns which is connected to the load 9. The primary winding Np, the secondary winding Ns, and the secondary winding Nf are mutually electromagnetically coupled.

The rectification device 5 includes a rectifier 6 connected in series with the secondary winding Ns; and a capacitance 7 provided in parallel therewith, for example. The rectification device 5 rectifies the voltage produced in the secondary winding Ns. The resistance 8 and the load 9 are connected in parallel on the output side of the rectification device 5, between the output of the rectification device 5 and one end of the secondary winding Ns.

The rectification device 15 is connected to the secondary winding Nf and rectifies the voltage produced in the secondary winding Nf. The rectification device 15 includes a rectifier 16 connected in series with the secondary winding Nf and a capacitance 17 connected in parallel with the secondary winding Nf. The resistor 18 and the load 19 are connected in parallel with the output side of the rectification device 15.

The control device 20 detects a voltage V24 corresponding to a current iop which flows through the primary winding Np and a voltage Vsens produced in the secondary winding Nf. Then, the control device 20 controls the switch 3 based on the detected voltage Vsens; the detected voltage V24; and an adjustment amount related to the voltage Vin of the power supply 2.

A detection device 24 detects the current iop using the voltage V24 across the detection device 24.

The adjustment amount generation device 30 generates an adjustment amount (adjustment current value) so as to cancel out an effect caused by a change in the voltage Vin included in the voltage V24 based on the voltage Vin, and outputs the generated result to the control device 20. The adjustment amount is generated in accordance with the change in the voltage Vin and the adjustment amount is included in the current iop.

Figure 2:
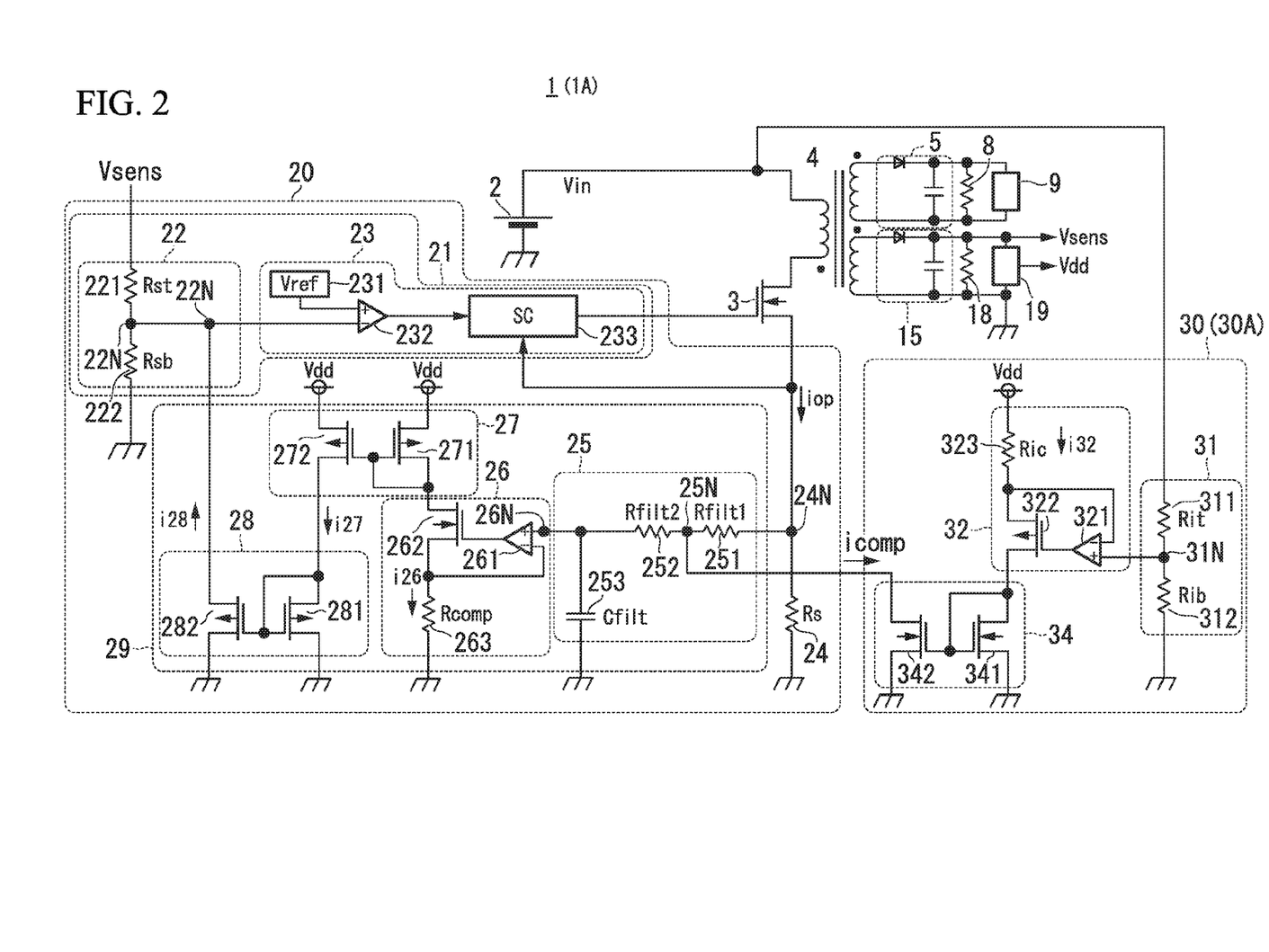
FIG. 2 is a configuration diagram illustrating a power supply device 1 according to the first embodiment.

FIG. 2 is a configuration diagram of the power supply device 1 according to the first embodiment. Of the features shown, the same numerals and letters are applied to the same features as those shown in FIG. 2, so that a repeat recitation of some features will be omitted. The load 19 according to the present embodiment includes a power supply device which supplies power which causes a circuit on the primary side to function, and the output voltage thereof is set to be a voltage Vdd.

In this embodiment, the adjustment amount generation device 30 is a circuit that includes a voltage divider 31, a current source (current generation device) 32, and a current mirror device 34.

The voltage divider 31 includes a resistor 311 and a resistor 312 and voltage-divides a voltage Vin by a voltage dividing ratio. Below, the voltage of a connecting point 31N is denoted as a voltage V31.

The current source 32 generates a current corresponding to the voltage V31. In the embodiment, the current source 32 includes an operational amplifier 321; a MOSFET (metal-oxide-semiconductor field-effect transistor) 322; and a resistor 323. The MOSFET 322 is provided on the output side of the operational amplifier 321 and a voltage buffer circuit is formed by the operational amplifier 321 and the MOSFET 322. The resistor 323 includes an impedance Ric. The power supply voltage Vdd (power supply of the load 19) is applied at one end of the resistor 323, and the MOSFET 322 is connected at the other end thereof. A voltage based on the potential difference of the power supply voltage Vdd and an output voltage of the voltage buffer circuit, or a difference (Vdd−V31) between the power supply voltage Vdd and an input voltage (the voltage V31) of the operational amplifier 321 is applied to the resistor 323. When the voltage V31<the voltage Vdd, the magnitude of a current i32 which flows through the resistor 323 is ((Vdd−V31)/Ric). When the voltage V31≥the voltage Vdd, the current i32 does not flow the resistor 323. In this way, the current source 32 generates the current i32 of a current value corresponding to the voltage V31.

The current mirror device 34 includes a MOSFET 341 and a MOSFET 342 and forms a current mirror circuit using the MOSFET 341 and the MOSFET 342. The current mirror device 34 generates a current icomp based on the current i32. The magnitude of the current icomp when the voltage V31<the voltage Vdd is determined by the current mirror ratio and the magnitude ((Vdd−V31)/Ric) of the current i32

With the configuration as described above, the adjustment amount generation device 30 generates the current icomp as an adjustment amount based on the input voltage Vin. Herein, when the current icomp flows toward the output end of the adjustment amount generation device 30 from the control device 20 that direction of current flow is considered positive.

The control device 20 includes a switching control device 21, the detection device 24, and a compensation amount generation device 29.

The switching control device 21 controls the switch 3 such that power supplied to the load 9 via the insulating transformer 4 is maintained at a constant, or nearly constant, value. The switching control device 21 generates a control amount (for example, a duty ratio) for controlling the switch 3 based on a compensation amount generated by the compensation amount generation device 29 and a voltage Vsens produced in the secondary winding Nf.

The switching control device 21 includes a voltage divider 22 and a drive device 23. The voltage divider 22 includes a resistor 221 and a resistor 222 that are serially connected. The end of the resistor 221 other than the end thereof connected to resistor 222 is connected to the secondary winding Nf, and the end of the resistor 222 other than the end thereof connected to resistor 221 is grounded, and the output end of the current mirror device 28 is connected to the connection point 22N of the resistor 221 and the resistor 222. The voltage Vsens is applied to the voltage divider 22. The voltage divider 22 serves as a load of the current mirror device 28 of the compensation amount generation device 29. An output current (a current i 28) of the current mirror device 28 is supplied to the voltage divider 22. The voltage V22 of the connecting point 22N changes in dependence on both a change of the voltage Vsens and a change of the output current (current i28) of the current mirror device 28.

The drive device 23 includes a reference power supply 231, an error amplifier 232, and a switching controller (SC) 233. The reference power supply 231 outputs a reference voltage Vref. The error amplifier 232 compares the voltage V22 in the voltage divider 22 to the reference voltage Vref and calculates an error voltage. The SC 233 generates a control amount based on the calculated error voltage to control the switch 3. For example, the SC 233 PWM-modulates (pulse width modulates) the generated control amount and adjusts the temporal ratio (duty ratio) of the periods of a conduction state and a shutoff state of the switch 3. For the present embodiment, when the voltage V22 is lower than the reference voltage Vref, the drive device 23 makes an adjustment to extend the conduction time period of the switch 3.

The detection device 24 includes a sense resistor having one end thereof grounded. The sense resistor has an impedance Rs. The voltage V24 is produced in the detection device 24 by the current iop which flows through the primary winding Np.

In this embodiment, the compensation amount generation device 29 is a circuit that includes a filter device 25, a current source 26, a current mirror device 27, and a current mirror device 28.

The filter device 25 generates a combined signal based on the voltage V24 and the adjustment amount generated by the adjustment amount generation device 30. For example, the filter 25 includes a resistor 251 (a first impedance device); a resistor 252 (a second impedance), and a capacitor 253. The filter device 25 forms a low-pass filter of the serially connected resistors 251 and 252 and the capacitor 253. The combined impedance of the resistors 251 and 252 are selected to be sufficiently larger than the impedance of the detection device 24. For example, the filter device 25 determines a cutoff frequency thereof such that the variable component of the current caused by switching the switch 3 is reduced and the control system of the power supply device 1 is stabilized. The output end of the adjustment amount generation device 30 is connected to the connecting point 25N of the resistors 251 and 252, to which the adjustment amount is supplied.

When the current icomp flows from the control device 20 toward the output end of the adjustment amount generation device 30, the voltage V25 of the connecting point 25N is brought to be lower than the voltage V24 of the connecting point 24N. The potential difference thereof changes in correspondence with the magnitude of the current icomp. As described above, the current icomp, which is generated by the adjustment amount generation device 30, flows to the connecting point 25N to adjust the voltage V25 based on the current icomp. The filter device 25 creates the voltage V25 as a signal for generating a compensation amount.

The filter device 25 is configured to be a low-pass filter to smooth out fluctuations in the voltage V24. The filter device 25 causes a voltage signal, having an amount corresponding to a potential difference (a voltage drop) between the voltage V24 and the voltage V25 caused by the current icomp, to be subtracted from the smoothed voltage V24 as an output signal.

The current source 26 includes an operational amplifier 261, a MOSFET 262, and a resistor 263. An output signal generated by the filter device 25 is supplied to an input terminal 26N of the current source 26. The MOSFET 262 is provided on the output side of the operational amplifier 261; for example, a voltage buffer circuit is formed by the operational amplifier 261 and the MOSFET 262. The resistor 263 has an impedance Rcomp, and has one end thereof grounded and has the other end connected to the MOSFET 262. An output voltage of the voltage buffer circuit, or, in other words, an input voltage (a voltage V26) of the operational amplifier 261, is applied across the resistor 263. A current i26 which flows through the resistor 263 is (V26/Rcomp). In this way, the current source 26 generates the current i26 corresponding to the voltage V26.

The current mirror device 27 includes a MOSFET 271 and a MOSFET 272 and forms a current mirror circuit. The current mirror device 27 generates a current i27 based on the current i26. The current i27 is determined by the current mirror ratio and the magnitude of the current i26.

The current mirror device 28 includes a MOSFET 281 and a MOSFET 282 and forms a current mirror circuit. The current mirror device 28 generates a current i28 based on the current i27. The current i28 is determined by the current mirror ratio and the magnitude of the current i27.

Each of the current source 26, the current mirror device 27, and the current mirror device 28 subjects an input signal to a proportional calculation (linear conversion) in a predetermined ratio. A signal (the current i28) which is acquired through the current source 26, the current mirror device 27, and the current mirror device 28 is a signal input to the current source 26 that is subjected to proportional calculation (linear conversion) in a predetermined ratio that is defined in advance.

By configuring the compensation amount generation device 29 as described above, the compensation amount generation device 29 generates the current i28 as a compensation amount to be supplied to the switching control device 21 based on an adjustment amount generated by the adjustment amount generation device 30 and the voltage V24. For example, when the current which flows through the primary winding Np increases, the current i28 increases to cause the voltage V22 to decrease. When the voltage V22 is lower than the reference voltage Vref, the drive device 23 makes an adjustment such as to extend the conduction time of the switch 3, i.e., it modifies the duty cycle of the switch such that the time period of the shutoff time is shorter. Cases in which the current which flows through the primary winding Np increases includes a case in which a current which flows through the load 9 increases and a case in which the input voltage Vin of the power supply 2 decreases. The power supply device 1 compensates for a change in the current which flows through the primary winding Np if the input voltage Vin changes. The load compensation gain in the power supply device 1 is determined by the voltage current conversion gain of the compensation amount generation device 29. The voltage current conversion gain of the compensation generation device 29 is determined by the impedance Rcomp of the resistor 263, current mirror ratios of the current mirror device 27 and the current mirror device 28, and the impedance Rst of the resistor 221.

An operation of the power supply device 1 is described with reference to FIGS. 3 to 5.

Figure 3:
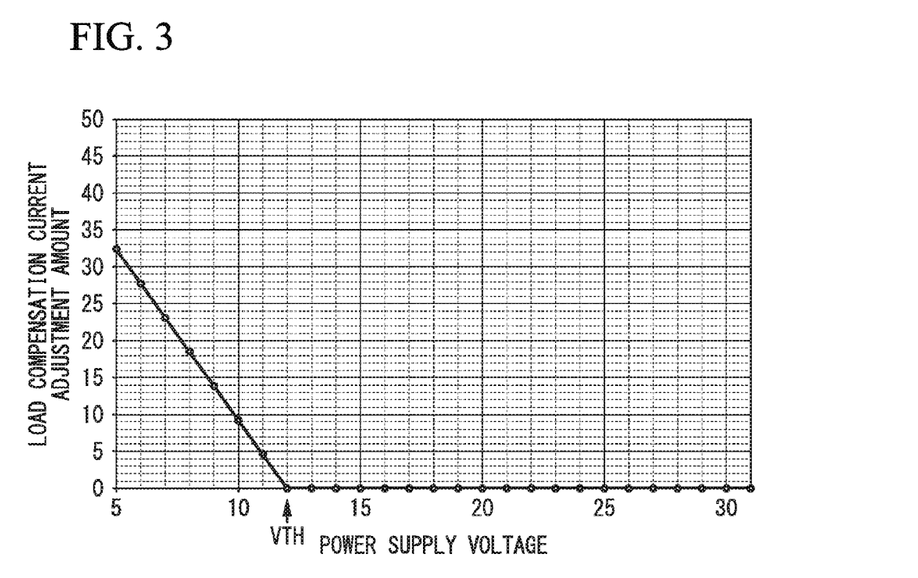
FIG. 3 is a graph illustrating an adjustment amount related to the power supply device 1 according to the first embodiment.

FIG. 3 is a graph illustrating an adjustment amount based on a signal generated by the adjustment amount generation device 30. The graph shows an example of the setting of the load compensation current adjustment amount versus an input voltage Vin. The load compensation current is a current generated to compensate for fluctuation in the current which flows through the load. For example, the current i28 corresponds to the load compensation current.

In FIG. 3, the voltage range in which the load compensation current adjustment amount changes based on the input voltage Vin and a voltage range in which the load compensation current adjustment amount is zero are shown, where the voltage VTH is the transition voltage where the load compensation current adjustment amount changes between a fixed amount of 0 and a variable amount based on Vinr. The load compensation current adjustment amounts are preset to a value in which the current icomp is multiplied by a predetermined constant k, for example. First, the current icomp is determined as follows:

(1) When the input voltage Vin is in a range of voltage that is lower than the voltage VTH, the adjustment amount generation device 30 linearly changes the magnitude of the current i32 and the current icomp by a value corresponding to a change in the input voltage Vin.

(2) On the other hand, when the input voltage Vin is in a range of a voltage which exceeds the voltage VTH, the adjustment amount generation device 30 causes the magnitude of the current i32 and the current icomp to be 0 and thus they do not depend on the change of the input voltage Vin.

Based on these results, the load compensation current adjustment amount is an amount in which the current icomp, which changes linearly in response to changes in the voltage Vin, is multiplied by the constant k when the input voltage Vin is in a range of voltage that is lower than the voltage VTH, and is zero when the input voltage Vin is in a voltage range which exceeds the voltage VTH.

To set the voltage VTH to a predetermined value, the resistance ratio of the voltage divider 31 is established or selected such that the voltage V31 when the input voltage Vin is at the desired voltage VTH corresponds to a voltage Vdd, the value of which is thus selectable based on the resistance ration of the voltage divider 31.

According to the configuration in FIG. 2, the constant k takes a value which is determined by the difference in voltage between the connecting point N25 to the connecting point N22.

An example shown in FIG. 3 is one example of the load compensation current adjustment amount when the voltage VTH is set to 12V. In a voltage range (the voltage Vin<12V) in which the load compensation current adjustment amount changes in accordance with the input voltage Vin, the load compensation current adjustment amount increases in a linear fashion (monotonically) the input voltage Vincis lowered. The slope of this graph is determined by the impedance Ric of the resistor 323, the impedance Rfilt1 of the resistance 251, and the constant k.

Figure 4:
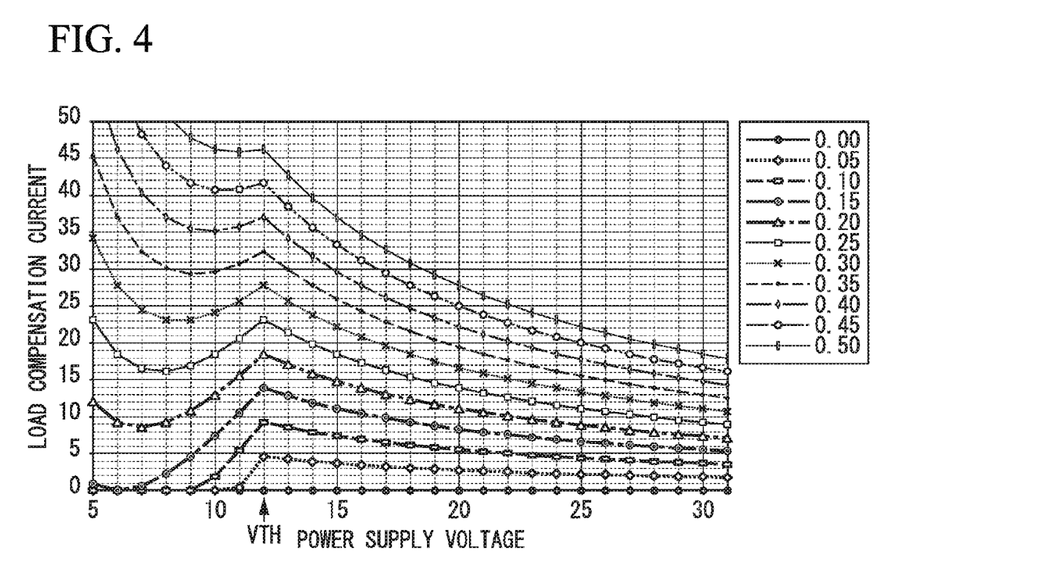
FIG. 4 is a graph illustrating a load compensation current related to the power supply device 1 according to the first embodiment.

FIG. 4 is a graph illustrating the load compensation current according to the power supply device 1 of the embodiment. FIG. 5 is a graph illustrating the load compensation current related to the power supply device shown as a comparative example. In FIGS. 4 and 5 are shown a plurality of graphs showing the load compensation current against the input voltage Vin (power supply voltage) with a current which flows through the load 9 as a variable (with the key for the symbols thereof shown in the box to the right of each Fig.). These figures show the current value which flows through the load 9 for selected currents from 0 to 0.5 A in steps of 0.05 A.

Figure 5:
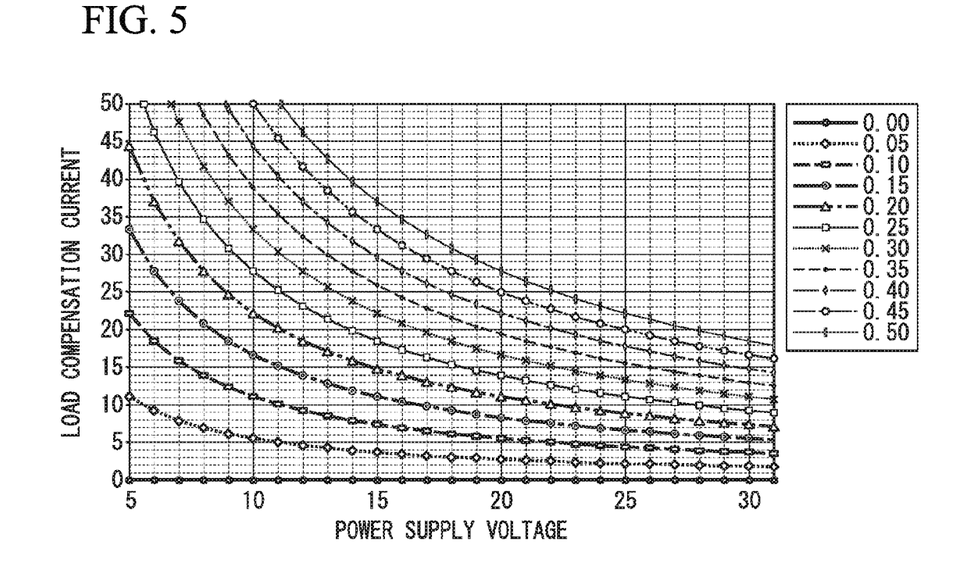
FIG. 5 is a graph illustrating the load compensation current related to the power supply device shown as a comparative example.

The power supply device of the comparative example in FIG. 5 corresponds to one in which the adjustment amount generation device 30 according to the present embodiment is not included, or one in which the adjustment amount of the adjustment amount generation device 30 is 0 over the entire voltage range, for example. In other words, the power supply device of the comparative example controls the switch based on the average value of the voltage V24 and the voltage Vsens which changes in relation to the voltage which is produced in the secondary winding Nf.

From the graph in FIG. 5, it can be seen that the load compensation current changes in accordance with the magnitude of the input voltage Vin even when the current which flows through the load 9 is constant. For example, the average value of the current which flows through the primary winding Np is inversely proportional to the input voltage Vin when the current which flows through the load is constant. If the load compensation current is generated based on the average value of the current which flows through the primary winding Np, the change of the load compensation current with respect to the input voltage Vin is similarly inversely proportional to the input voltage Vin.

The graph in FIG. 4 shows an example of results of adjusting the load compensation current based on the adjustment amount shown in FIG. 3. In other words, the graph in FIG. 4 corresponds to the result of subtracting the adjustment amount in FIG. 3 from the load compensation current value in which an effect due to the change of the input voltage Vin shown in FIG. 5 is seen. In the graph in FIG. 4, the input voltage Vin exhibits a local compensation current increase at the voltage VTH where the adjustment amount changes from a positive amount based on the power supply voltage to the "0" amount. In the voltage range in which the voltage Vin is lower than the voltage VTH, the graph in FIG. 4 shows values which are less than the values of the load compensation current shown in FIG. 5.

Here, when the current which flows through the load 9 is 0.25 A, the power supply device 1 of the present embodiment (FIG. 4) and the power supply device of the comparative example (FIG. 5) are compared under the conditions in which the input voltage Vin changes from 6 to 15V. While the fluctuation in the load compensation current in FIG. 4 falls within the fluctuation range of 16 to 23, the fluctuation of the load compensation current in FIG. 5 falls within the fluctuation range of 18 to 46. In this way, it is seen that the power supply device 1 according to the present embodiment makes it possible to suppress the inversely proportional effect on the load compensation current versus the change in the input voltage Vin.

In this way, the power supply apparatus 1 can reduce the effect on the load compensation current due to a change in the input voltage Vin by using a simple method of adding a current as an adjustment amount without using a multiplication circuit, etc.

According to the above-described first embodiment, the adjustment amount generation device 30 generates an adjustment amount to suppress a change of current, wherein the change of current is in the first current iop, and the change of current depends at least in part on a change in voltage of the power supply 2, and the first current iop flows through the primary windings Np. Moreover, the control device 20 controls the switch 3 based on the current iop which flows through the primary windings Np; the voltage Vsens, which is produced in the secondary windings Nf; and the current icomp, which is generated by the adjustment amount generation device 30. In this way, the power supply device 1 according to the present embodiment may maintain a stable voltage on the load in response to a change in the voltage of the power supply.

(Second embodiment)

In the adjustment amount generation device 30 according to the first embodiment, an adjustment amount which depends on the input voltage Vin is generated by a single current source 32. On the other hand, in an adjustment amount generation device 30A according to the second embodiment, an adjustment amount which depends on the input voltage Vin is generated by a plurality of current sources. Below, explanations will be provided mainly on this point.

Figure 6:
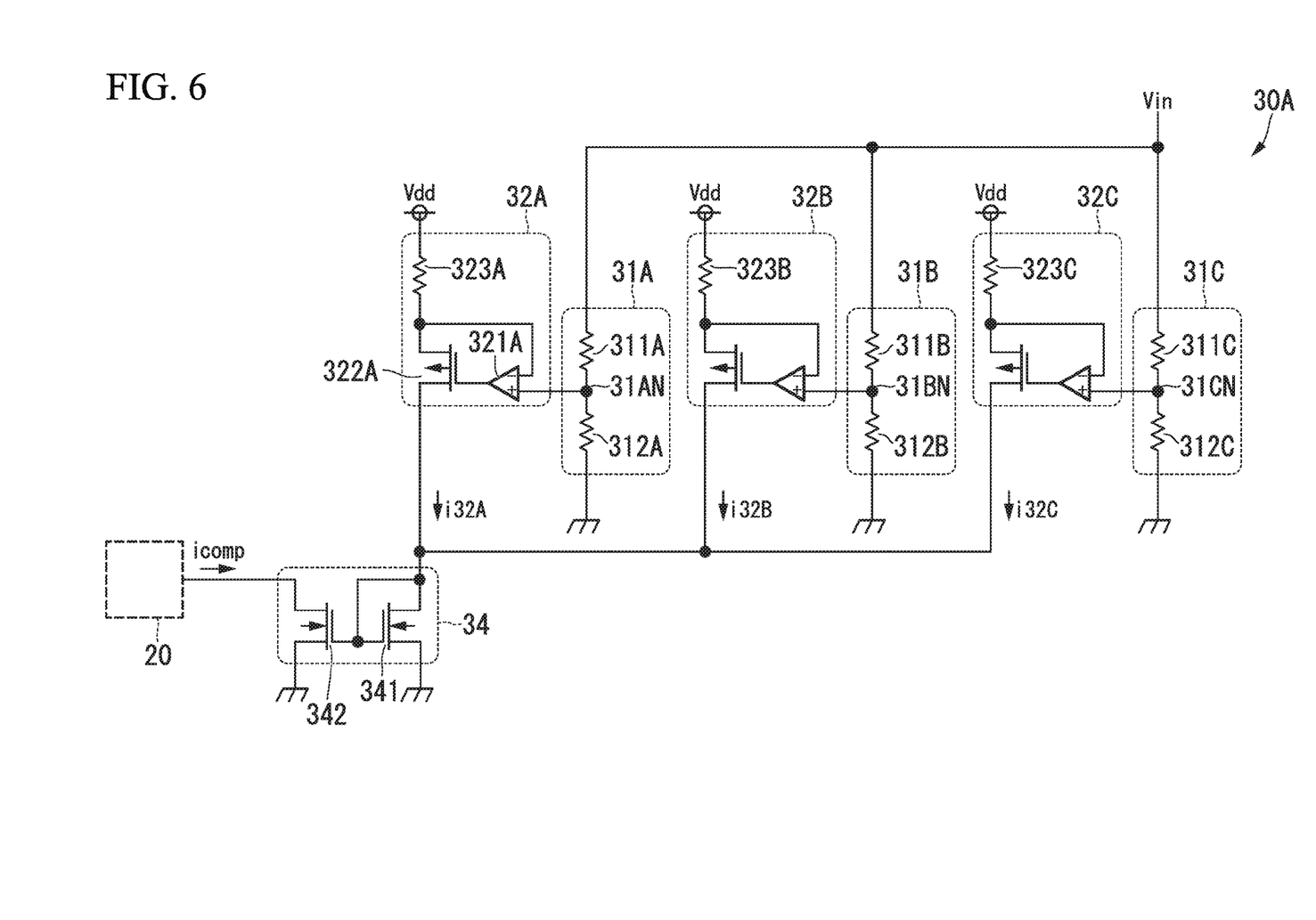
FIG. 6 is a configuration diagram illustrating an adjustment amount generation device 30 according to a second embodiment.

The power supply device 1A according to the present embodiment includes an adjustment amount generation device 30A shown in FIG. 6 in place of the adjustment amount generation device 30 shown in FIG. 2.

FIG. 6 is a configuration diagram illustrating the adjustment amount generation device 30A according to the second embodiment. The adjustment amount generation device 30A includes voltage dividers 31A to 31C; current sources 32A to 32C; and a current mirror device 34.

The voltage divider 31A includes a resistor 311A and a resistor 312A, and voltage divides the voltage Vin by a predetermined voltage-dividing ratio based on the resistance value of the resistors. Below, the voltage at a connecting point 31AN is denoted as a voltage 31A.

The current source 32A includes an operational amplifier 321A, a MOSFET 322A, and a resistor 323A. The current source 32A has the same configuration as that of the current source 32 (FIG. 2). The resistor 323A has an impedance RicA. When the voltage V31A<the voltage Vdd, the magnitude of the current i32A which flows through the resistor 323A is ((Vdd−V31A)/RicA). When the voltage V31A≥the voltage Vdd, the current i32A does not flow. In this way, the current source 32A generates a current i32A having a value corresponding to the voltage V31A.

Constants of the individual elements of the voltage divider 31A and the current source 32A are determined to determine a voltage range A in which the magnitude of the current i32A is linearly changed in accordance with the change in the input voltage Vin and a voltage range $\overline{A}$ in which the magnitude of the current i32A is 0 and therefor is not dependent on the change of the input voltage Vin.

The same configuration is provided for the voltage divider 31B and the current source 32B and for the voltage divider 31C and the current source 32C as for the voltage divider 31A and the current source 32A.

The voltage divider 31B includes a resistor 311B and a resistor 312B, and voltage divides the voltage Vin by the predetermined voltage-dividing ratio based on the resistance value of the resistors. Below, the voltage of a connecting point 31BN is shown as a voltage V31B.

The current source 32B includes a resistor 323B having an impedance RicB. When the voltage V31B<the voltage Vdd, the magnitude of the current i32B which flows through the resistor 323B is ((Vdd−V31B)/RicB). When the voltage V31B≥the voltage Vdd, the current i32B does not flow. In this way, the current source 32B generates the current i32B of a current value corresponding to the voltage V31B. The constants of the individual elements of the voltage divider 31B and the current source 32B are determined to determine a voltage range B in which the magnitude of the current i32B is linearly changed in accordance with a change in the input voltage Vin and a voltage range $\overline{B}$ in which the magnitude of the current i32B is set to 0 so that it does not depend on a change of the input voltage Vin.

The voltage divider 31C includes a resistor 311C and a resistor 312C, and voltage divides the voltage Vin by a predetermined voltage-dividing ratio based on the resistance value of the resistors. Below, the voltage of the connecting point 31CN is denoted as the voltage V31C.

The current source 32C includes a resistance 323C having an impedance RicC. When the voltage V31C<the voltage Vdd, the magnitude of the current i32C which flows through the resistor 323C is ((Vdd−V31C)/RicC). When the voltage V31C≥the voltage Vdd, the current i32C does not flow. In this way, the current source 32C generates a current i32C of a current value corresponding to the voltage V31C. Constants of the individual elements of the voltage divider 31C and the current source 32C are determined to determine a voltage range C in which the magnitude of the current i32C is linearly changed in accordance with a change in the input voltage Vin and a voltage range $\overline{C}$ in which the magnitude of the current i32C is set to 0 such that it does not depend on a change in the input voltage Vin. A method of setting the individual voltage ranges are the same as for the adjustment amount generation device.

The voltage-dividing ratios of the voltage dividing devices 31A to 31C are mutually different. In other words, the voltages V31A to V31C each have different values. Moreover, each of the impedances RicA, RicB, and RicC are selected in accordance with a desired adjustment value.

The current mirror device 34 includes a MOSFET 341 and a MOSFET 342 which form a current mirror circuit. The current mirror device 34 generates a current icomp based on currents i32A-i32C. The current icomp is determined by the current mirror ratio and a total value of individual current values of the currents i32A-i32C.

The above-described current icomp flows into the control device 20 of the power supply device 1A. The power supply device 1A controls the duty cycle of the switch 3 based on the adjustment amount (the current icomp) generated as described above.

An operation of the power supply device 1A is described with reference to FIGS. 7 and 8.

Figure 7:
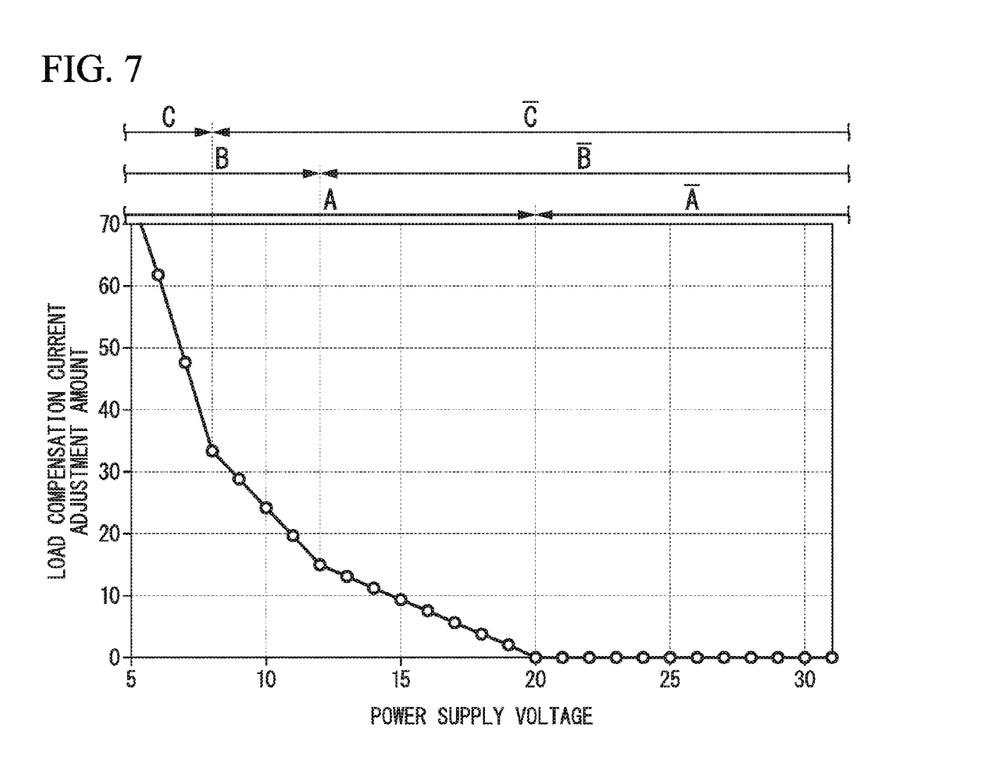
FIG. 7 is a graph illustrating an adjustment amount of the load compensation current related to a power supply device 1A according to the second embodiment.

FIG. 7 is a graph illustrating an adjustment amount of the load compensation current related to the power supply device 1A according to the second embodiment. The graph in FIG. 7 shows an example of setting a load compensation current adjustment amount against the input voltage Vin. The load compensation current adjustment amount is a value in which the current icomp is multiplied by a predetermined constant k, for example. The adjustment amount increases as the input voltage Vinv decreases.

For example, voltage ranges A ($\overline{A}$), B ($\overline{B}$), C ($\overline{C}$) are respectively determined. An example is shown in which a voltage which determines a border between the voltage range A and the voltage range $\overline{A}$ is set to 20V; a voltage which determines a border between the voltage range B and the voltage range $\overline{B}$ is set to 12V; and a voltage which determines a border between the voltage range C and the voltage range $\overline{C}$ is set to 8V. As a result, three different linear compensation ranges, each of which has a different slope in the curve of the current adjustment amount versus power supply voltage, are provided. Additionally, of the three compensation ranges, the range at the lowest voltage has the greatest slope, and that at the highest range of current compensated voltage has the lowest slope.

For example, in a range of less than 8V, the voltage ranges A to C overlap, so that the load compensation current adjustment amount is determined from the total value of individual currents of the currents i32A to i32C.

In a range of greater than or equal to 8V and less than 12V, the voltage ranges A, B, and $\overline{C}$ overlap, so that the load compensation current adjustment amount is determined from the total value of individual currents of the currents i32A and i32B. For this range, the current i32C does not flow.

In a range of greater than or equal to 12V and less than 20V, the voltage ranges A, $\overline{B}$, and $\overline{C}$ overlap, so that the load compensation current adjustment amount is determined from the value of the current i32A. For this range, the neither the current i32B nor the current i32C flows.

In a range of greater than 20V, the voltage ranges $\overline{A}$, $\overline{B}$, $\overline{C}$ overlap, so that the load compensation current adjustment amount is zero.

Figure 8:
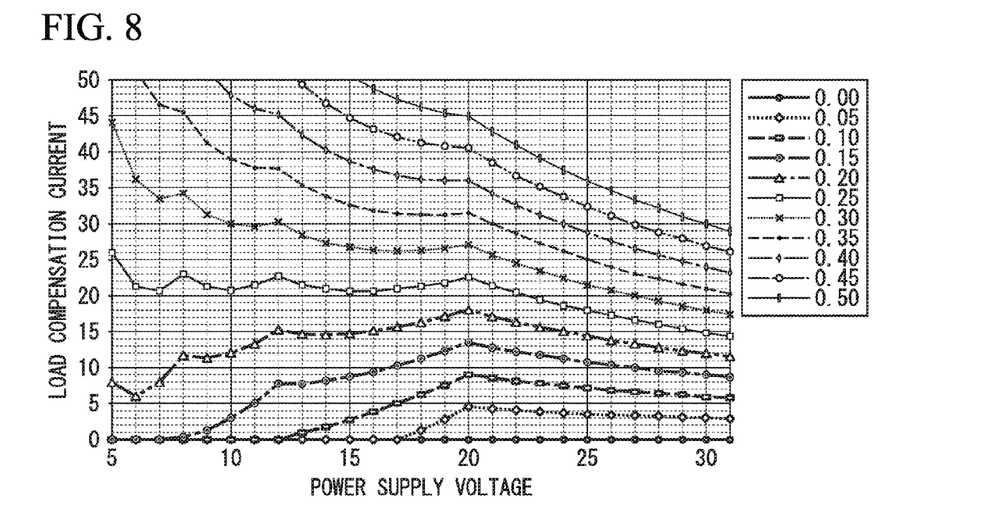
FIG. 8 is a graph illustrating the load compensation current related to the power supply device 1A according to the second embodiment.

FIG. 8 is a graph illustrating the resulting load compensation current related to the power supply device 1A using the adjustment amounts provided by the adjustment circuit of the second embodiment. The graph in FIG. 8 shows an example of a result of adjusting the load compensation current based on the adjustment amount shown in FIG. 7. In other words, the graph in FIG. 8 corresponds to a result of subtracting the adjustment amount shown in FIG. 7 from the value of the load compensation current shown in FIG. 5. For this example, the load compensation amount against the desired voltage range in which the input voltage Vin is determined across 12V is decreased from the value shown in FIG. 5 such as to adapt to the use in which the input voltage Vin changes with 12V as the reference.

In FIG. 8, when the current which flows through the load 9 is 0.25 A, for example, the power supply device 1A, and the power supply device according to the comparative example (FIG. 5) are compared under the condition in which the input voltage Vin changes from 6 to 15V. It is seen that the load compensation current falls within the fluctuation range of 20 to 23 and a suppressing of the change in the input voltage Vin of the power supply device 1A is made possible in view of the fluctuation range being from 18 to 46 in the power supply device of the comparative example. Moreover, in the power supply device 1A, even when the upper limit of the range of the input voltage Vin is increased, the fluctuation of the load compensation current falls within the above-described fluctuation range.

According to the above-described second embodiment, the same advantageous effect as the first embodiment is realized. Moreover, the power supply device 1A may supply a current icomp generated based on a plurality of current sources to decrease a fluctuation amount of the load compensation current and widen the allowed range of the change in the input voltage Vin. While a configuration in which three voltage dividers and three current sources are combined in the above-described example, there is no limit to the number of the voltage divider and current source elements. Moreover, one voltage divider may be configured to be shared among a plurality of current sources.

(Third embodiment)

The adjustment amount generation device 30 according to the first embodiment is arranged to provide linear changes in the current adjustment amount over a range of input voltages Vin, which amount is generated based on the value of the input voltage Vin. In contrast, an adjustment amount generation device 30B according to a third embodiment is arranged to provide a non-linear change on the current adjustment amount dependent on the input voltage Vin for the same voltage range. Below, explanations will be given mainly on this point.

Figure 9:
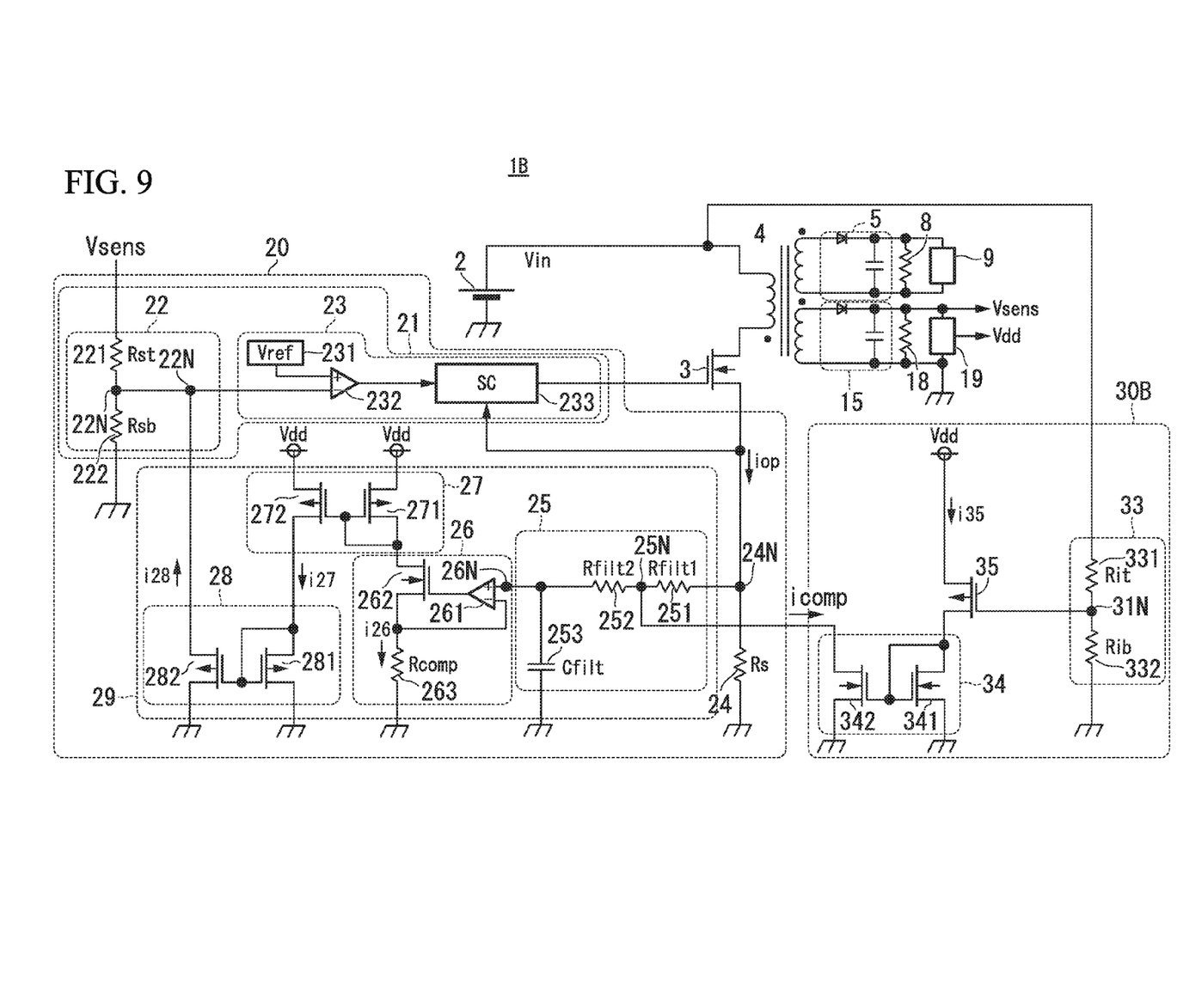
FIG. 9 is a configuration diagram illustrating a power supply device 1B according to a third embodiment.

FIG. 9 is a configuration diagram illustrating a power supply device 1B according to the third embodiment. The same reference numerals and letters are given to the features shown in FIG. 9 as those shown in FIG. 2, and recitations of reference numerals and letters of some of the features of elements are omitted. The power supply device 1B includes the adjustment amount generation device 30B in place of the adjustment amount generation device 30 shown in FIG. 2.

The adjustment amount generation device 30B includes a voltage divider 33, a MOSFET (current generation device) 35, and a current mirror device 34.

The voltage divider 33 includes a resistor 331 and a resistor 332, and it voltage-divides the voltage Vin based on the resistor values. Below, the voltage of the connecting point 33N is denoted as a voltage V33.

The MOSFET 35 generates a current corresponding to the voltage V33. For example, The MOSFET 35 is a p-channel MOSFET. The MOSFET 35 receives a current which changes in accordance with an input voltage Vin using a non-linear region of the p-channel MOSFET. The MOSFET 35 outputs a current i35 which is determined by the voltage dividing ratio in accordance with values of the resistor 331 and the resistor 332, the input voltage Vin, and a characteristic which depends on the p-channel MOSFET.

The current mirror device 34 generates a current icomp based on a current i35. The current icomp is determined by the current ratio and the magnitude of the current i35.

The above-described current icomp flows into the control device 20 of the power supply device 1B. Based on the adjustment amount (current icomp) generated as described above, the power supply device 1B controls the duty cycle of the switch 3.

The above-described third embodiment realizes the same advantageous effect as that of the first embodiment. Moreover, a non-linear adjustment amount versus changes in the input voltage Vin results, and thus the power supply device 1B according to the third embodiment may be more simply configured as compared to the power supply device 1 of the first embodiment. Moreover, the non-linear current output of the MOSFET 35 may be used to reduce the fluctuation amount of the load compensation current.

(Fourth Embodiment)

While the first to third embodiments represent a power supply device in which the load compensation current adjustment amount is a current, a fourth embodiment is a power supply device 1C in which the load compensation current adjustment amount is a voltage. Below, explanations are given mainly on this point.

Figure 10:
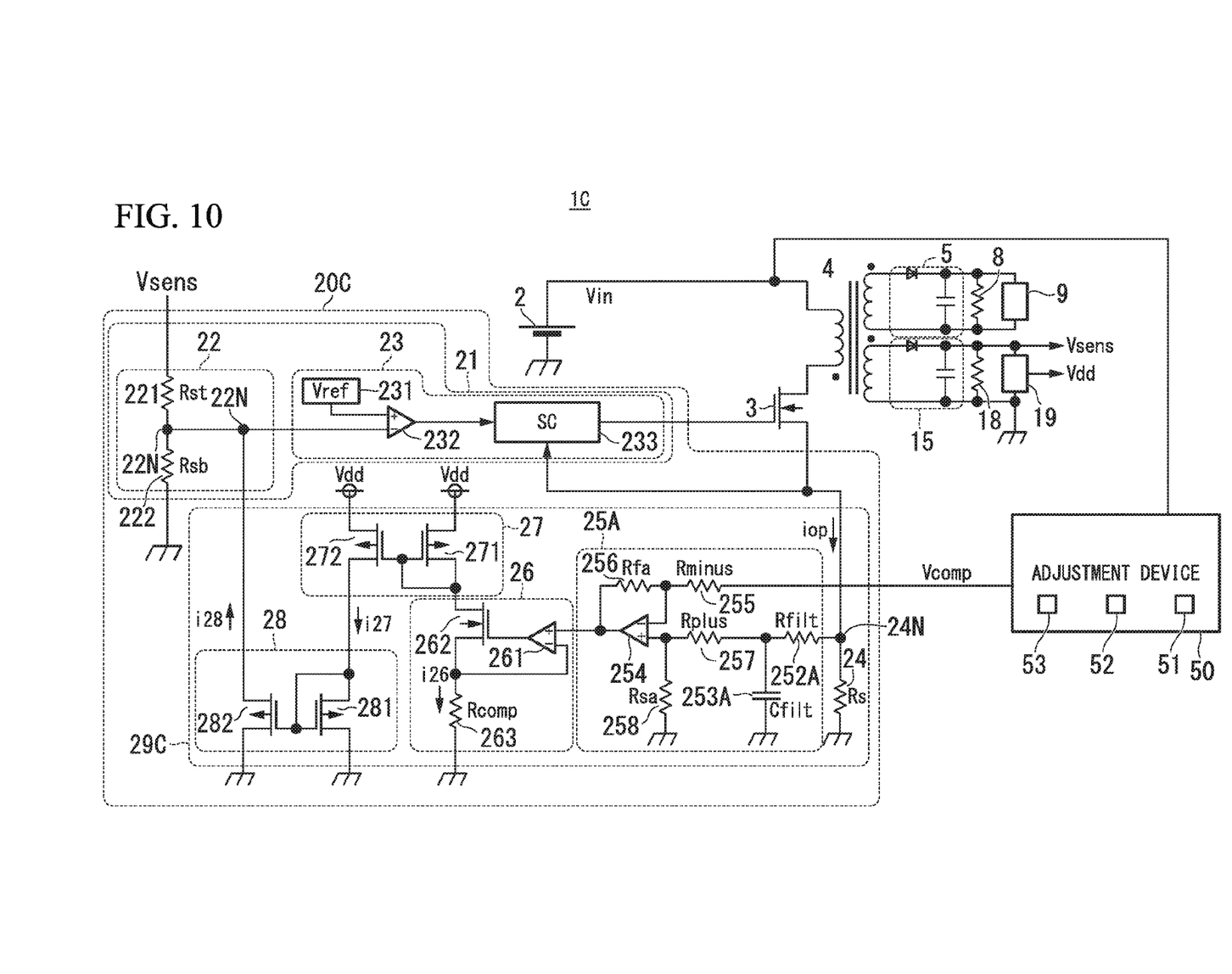
FIG. 10 is a configuration diagram illustrating a power supply device 1C according to a fourth embodiment.

FIG. 10 is a configuration diagram illustrating a power supply device 1C according to the fourth embodiment. The same numerals and letters are applied to the features shown in FIG. 10 as those shown in FIG. 2, and recitations of numerals and letters of some of the features are omitted.

The power supply device 1C according to the present embodiment includes a control device 20C and an adjustment device generation device 50 in place of the control device 20 and the adjustment amount generation device 30 shown in FIG. 2.

The adjustment amount generation device 50 generates an adjustment amount corresponding to the input voltage Vin as a voltage Vcomp. The adjustment generation device 50 includes an analog-digital conversion device 51, a signal conversion processing device 52, a digital-analog conversion device 53, for example. The analog digital conversion device 51 converts the input voltage Vin to a digital data DIN, and the signal conversion processing device 52 converts the converted result to desired digital data DOUT based on the digital data DIN. For the conversion to the digital data DOUT, the digital data DOUT may be calculated by a predetermined operation process. Alternatively, a table in which data calculated in advance are written may be referred to in order to acquire the digital data DOUT. Moreover, in the course of acquiring the digital data DOUT, various filtering processes, etc., may be carried out to enhance the accuracy of the digital data DOUT. The adjustment amount generation device 50 acquires an output voltage Vcomp of an analog signal based on the digital data DOUT by the digital-analog conversion device 53. The adjustment amount generation device 50 supplies the voltage Vcomp as an adjustment amount to the control device 20C.

The control device 20C includes a switching control device 21, a detection device 24, and a compensation amount generation device 29C.

The compensation amount generation device 29C includes a filter device 25A, a current source 26, a current mirror device 27, and a current mirror device 28.

The filter device 25A generates a combined signal based on the voltage V24 and the adjustment amount (the voltage Vcom) generated by the adjustment amount generation device 50. For example, the filter device 25A includes a resistor 252A and a capacitor 253A, and forms a low pass filter of the resistor 252A and the capacitor 253A. The impedance of the resistor 252A is set to be sufficiently larger than the impedance of the detection device 24. For example, the low pass filter reduces the variable component of the current by switching of the switch 3 (changing the duty cycle) and determines the cutoff frequency thereof so as to stabilize the control system of the power supply device 1C.

Moreover, the filter device 25A includes an operational amplifier 254, and resistors 255, 256, 257, and 258. The operational amplifier 254 forms a subtractor by a connection shown and outputs a result of subtracting a voltage Vcomp from an output voltage of the low pass filter as a voltage value. The individual impedances of the resistors 255-258 are Rminus, Rfa, Rplus, and Rsa.

The operational amplifier 254 performs an operation using an amplification rate which is determined by the individual impedances of the resistors 255-258.

The current source 26 generates a current corresponding to the voltage value of the output signal of the operational amplifier. The power supply device 1C controls the switch 3 based on the voltage value of the output signal of the operational amplifier 254 that was generated as described above.

The above-described fourth embodiment realizes the same advantageous effect as the first embodiment. The filter device 25A is configured such that a detection system which detects a current fluctuation of the primary windings Np and an operational device (an operational amplifier 254, etc.) which combines the adjustment amounts are separated therein. In this way, the power supply device 1C sets the adjustment amount as a voltage Vcomp to subtract the voltage Vcomp from an output voltage of the low pass filter using the operational amplifier 254 to separate a signal related to the adjustment amount from the low pass filter. As a result, the power supply device 1C uses the low pass filter to detect the current fluctuation of the primary windings Np and reduce the fluctuation amount of the load compensation current.

According to the above-described at least one embodiment, a switch 3 which adjusts a current iop which flows through the first winding Np connected to a power supply 2; an adjustment amount generation device 30 which generates an adjustment amount in accordance with a change in the voltage of the power supply 2 where the adjustment amount is included in the current iop; and a control device 20 which controls the switch 3 based on the adjustment amount and a voltage which is produced in secondary winding Nf which are electromagnetically coupled with the primary winding Np are provided to secure stability to a change of an input voltage Vin of the power supply 2.

Moreover, according to the embodiments, a compensation generation device 29 generates a compensation amount based on the adjustment amount and a voltage V24. A switching control device 21 controls the switch 3 based on the generated compensation amount and a voltage value Vsens which is produced in the secondary windings Nf. In this way, the power supply device according to the present embodiments may reduce an effect due to a change in the input voltage Vin of the power supply 2 to stably compensate for the change in the input voltage Vin.

Moreover, according to the embodiments, the compensation amount generation device 29 may generate a compensation amount by subtracting a value based on an adjustment amount to reduce an effect of a change in the input voltage Vin from the voltage V24, or an average value of the voltage V24.

While the power supply device according to the above-described embodiments is of a flyback converter type, the above-described technique may be applied to an insulating switching regulator (power supply device) using an insulating transformer, such as one of a forward converter type, a full-bridge converter type, a half-bridge converter type, a push-pull converter type, etc.

While the power supply device 1 according to the above-described embodiments adopts an insulating-type configuration, a non-insulating-type transformer may be used in place of the insulating transformer 4, or a gap between windings of the insulating transformer 4 may be connected for configuring a non-insulating-type power supply device. In this case, use of a secondary winding for supplying power to a load and a secondary winding for detecting a voltage Vsens for control may be a single secondary winding. For example, as a transformer in place of the transformer 4, one including only one of the secondary windings thereof may be used. The power supply 2 according to the above-described embodiment may be provided outside the power supply device 1, or may be configured by including it in a part of the configuration of the power supply device 1.

Some or all of the power supply devices according to the above-described embodiments may be configured as a semiconductor device.

While certain embodiments have been described, these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A power supply device, comprising:
   a primary winding and at least a first secondary winding connected to a load;
   a power supply, the primary winding connected to the power supply;
   a switch configured to adjust a first current flowing through the primary winding;
   an adjustment amount generation device configured to generate an adjustment amount to reduce a change in the first current, the change in the first current depending at least in part on a change in an output voltage of the power supply supplied to the load; and
   a control device including a compensation amount generation device configured to generate a compensation amount, which at least in part cancels out an effect due to the change in the output voltage of the power supply, by subtracting a signal corresponding to the adjustment amount from a signal corresponding to the first current, wherein the control device is configured to control the switch based at least in part on the compensation amount and a voltage produced across the secondary winding.

2. The power supply device according to claim 1, wherein the compensation amount generation device performs a linear operation using a constant that is based on a voltage indicative of the first current and a voltage indicative of the adjustment amount, to generate the compensation amount.

3. The power supply device according to claim 1, wherein the compensation amount generation device performs a linear operation using a constant that is based on a voltage acquired by averaging a voltage indicative of the first current and a voltage of a signal generated by a signal generation device based on the output voltage of the power supply, to generate the compensation amount.

4. The power supply device according to claim 1, wherein the compensation amount generation device modifies a signal acquired by subtracting the signal corresponding to the adjustment amount from the signal corresponding to the first current, to generate a signal corresponding to the compensation amount.

5. The power supply device according to claim 1, further comprising:
   a detection device which includes a sense resistor having one end thereof maintained at a ground potential,
   wherein the adjustment amount generation device supplies a second current comprising the adjustment amount to the control device,
   wherein the compensation amount generation device comprises an impedance device, a first terminal of the impedance device being connected to a non-ground potential terminal of the sense resistor; and
   wherein the compensation amount generation device causes the second current to flow through the impedance device to generate the compensation amount based on the value of the voltage of a second terminal of the impedance device.

6. The power supply device according to claim 5,
   wherein the impedance device comprises:
   a first impedance device portion having a first terminal is connected to the non-ground terminal of the sense resistor; and
   a second impedance device portion connected in series to the first impedance device portion; and
   a capacitor connected to an end of the second impedance device portion, and
   wherein the impedance device causes the second current to flow through the first impedance device portion to generate the compensation amount based on the voltage value of the second terminal of the first impedance device.

7. The power supply device according to claim 6, wherein the adjustment amount generation device comprises:
   a current generation device configured to generate a current which changes based on the output voltage of the power supply.

8. The power supply device according to claim 6, wherein the adjustment amount generation device comprises:
   a plurality of current generation devices, each of which generates a current whose current value differs from that of the other current generation devices, and which changes based on the output voltage of the power supply; and
   the currents generated by the individual current generation devices are collectively supplied to the control device as the second current.

9. The power supply device according to claim 1, wherein the adjustment amount generation device generates the adjustment amount, such that the adjustment amount changes linearly with respect to the output voltage of the power supply over at least a portion of output voltage range of the power supply.

10. The power supply device according to claim 1, wherein the adjustment amount generation device generates the adjustment amount, such that the adjustment amount changes non-linearly with respect to the output voltage of the power supply.

11. The power supply device according to claim 1, wherein the adjustment amount generation device generates the adjustment amount, such that the adjustment amount changes relative to the output voltage of the power supply over a first voltage range.

12. The power supply device according to claim 11, wherein the adjustment amount generation device generates the adjustment amount, such that the adjustment amount is zero when the output voltage of the power supply is outside of the first voltage range.

13. The power supply device according to claim 1, wherein the primary winding is insulated from the load.

14. A semiconductor device providing a current or voltage compensation value to a primary winding electromagnetically coupled to a secondary winding, wherein the secondary winding is connected to a load, comprising:
   a switch configured to adjust a first current which flows though the primary winding connected to a power supply;
   an adjustment amount generation portion configured to generate an adjustment amount to reduce a change in the first current, the change in the first current depending at least in part on a change in an output voltage of the power supply; and
   a control device including a compensation amount generation device configured to generate a compensation amount, which at least in part cancels out an effect due to the change in the output voltage of the power supply, by subtracting a signal corresponding to the adjustment amount from a signal corresponding to the first current, wherein the control device is configured to control the switch based at least in part on the compensation amount and a voltage produced across the secondary winding.

15. The semiconductor device of claim 14, wherein the adjustment amount changes linearly over a range of values of the output voltage of the power supply.

16. A method of adjusting at least one of the voltage and the current in a circuit, the circuit including at least a power supply, a primary winding, at least one secondary winding electromagnetically coupled to the primary winding, and a load connected across the secondary winding, comprising:
   flowing a first current though the primary winding connected to the power supply;
   generating an adjustment amount to reduce a change in the first current, the change in the current depending at least in part on a change in an output voltage of the power supply;
   generating a compensation amount, which at least in part cancels out an effect due to the change in the output voltage of the power supply, by subtracting a signal corresponding to the adjustment amount from a signal corresponding to the first current; and
   controlling the adjustment to the first current, based at least in part on the compensation amount and a voltage produced across the secondary winding.

17. The method of claim 16, wherein the adjustment amount varies linearly over a range of values of the output voltage of the power supply.

* * * * *